United States Patent [19]

Vranish

[11] Patent Number: 5,726,581
[45] Date of Patent: Mar. 10, 1998

[54] 3-D CAPACIFLECTOR

[75] Inventor: John M. Vranish, Crofton, Md.

[73] Assignee: The United States of America as represented by the Administrator of the National Aeronautics and Space Administration, Washington, D.C.

[21] Appl. No.: 613,802

[22] Filed: Mar. 8, 1996

[51] Int. Cl.[6] ................................................. G01R 27/26
[52] U.S. Cl. ................... 324/688; 324/690; 324/662; 340/870.37; 901/46; 901/10
[58] Field of Search ................................ 324/688, 662, 324/690; 340/870.37

[56] References Cited

U.S. PATENT DOCUMENTS

| | | | |
|---|---|---|---|
| 5,166,679 | 11/1992 | Vranish | 340/870.37 |
| 5,337,015 | 8/1994 | Lustig | 324/688 |
| 5,363,051 | 11/1994 | Jenstrom | 324/688 |

*Primary Examiner*—Ernest F. Karlsen
*Assistant Examiner*—Jose M. Solis
*Attorney, Agent, or Firm*—Robert D. Marchant; Eileen A. Lehmann; Guy M. Miller

[57] ABSTRACT

A capacitive type proximity sensor having improved range and sensitivity between a surface of arbitrary shape and an intruding object in the vicinity of the surface having one or more outer conductors on the surface which serve as capacitive sensing elements shaped to conform to the underlying surface of a machine. Each sensing element is backed by a reflector driven at the same voltage and in phase with the corresponding capacitive sensing element. Each reflector, in turn, serves to reflect the electric field lines of the capacitive sensing element away from the surface of the machine on which the sensor is mounted so as to enhance the component constituted by the capacitance between the sensing element and an intruding object as a fraction of the total capacitance between the sensing element and ground. Each sensing element and corresponding reflecting element are electrically driven in phase, and the capacitance between the sensing elements individually and the sensed object is determined using circuitry known to the art. The reflector may be shaped to shield the sensor and to shape its field of view, in effect providing an electrostatic lensing effect. Sensors and reflectors may be fabricated using a variety of known techniques such as vapor deposition, sputtering, painting, plating, or deformation of flexible films, to provide conformal coverage of surfaces of arbitrary shape.

7 Claims, 6 Drawing Sheets

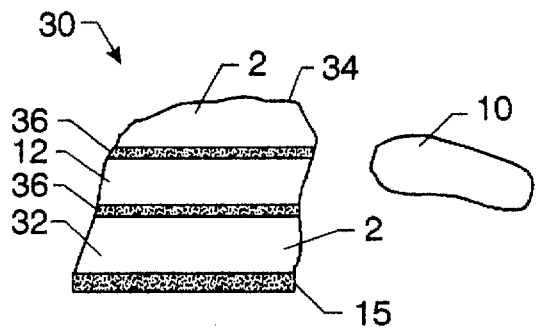
FIG. 4A
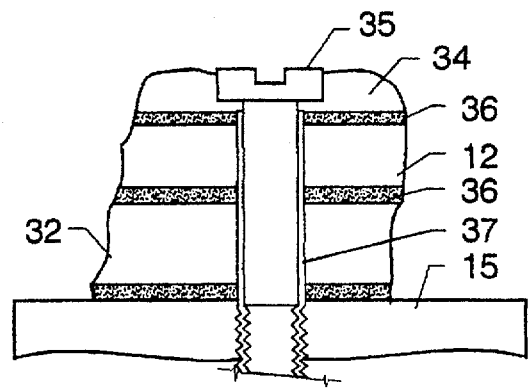
FIG. 4B
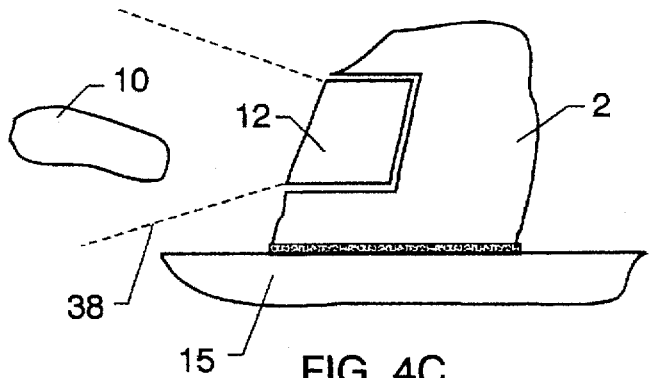
FIG. 4C
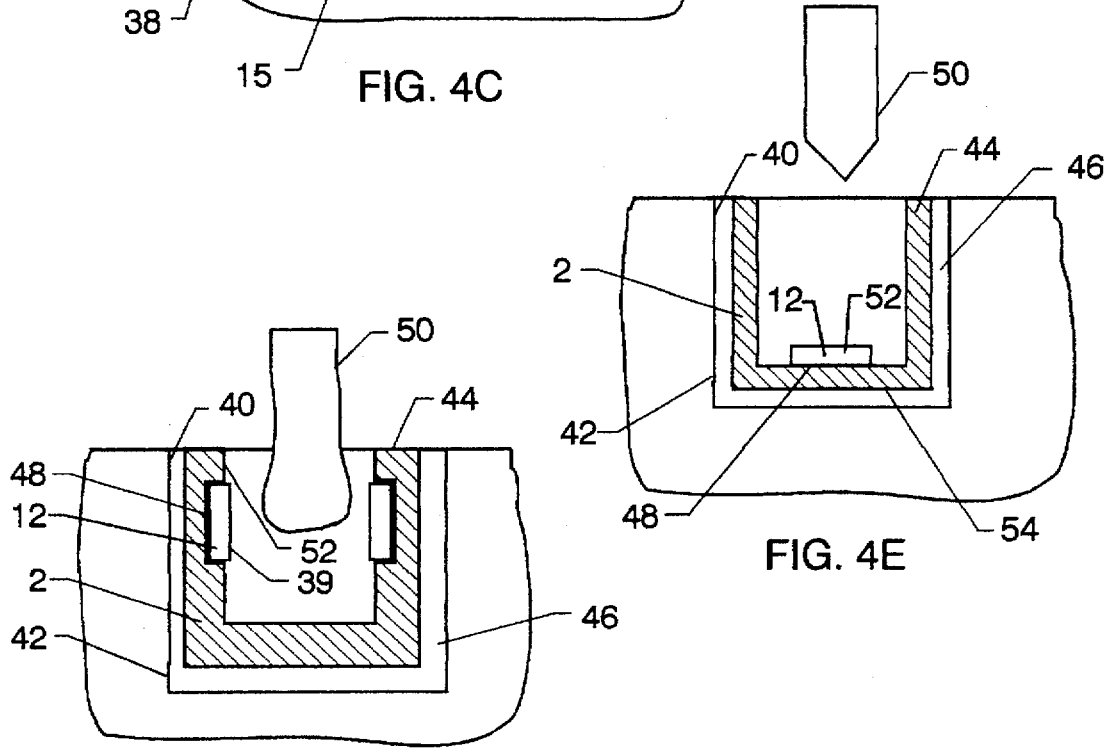
FIG. 4D
FIG. 4E

3-D CAPACIFLECTOR

ORIGIN OF THE INVENTION

The invention described herein was made by an employee of the United States Government, and may be manufactured and used by or for the Government for governmental purposes without the payment of any royalty thereon or therefor.

CROSS REFERENCE TO RELATED APPLICATIONS

The present invention is related to an invention shown and described in (1) U.S. Pat. No. 5,515,001 entitled "Current-Measuring Operational Amplifier Circuits", filed in the name of John M. Vranish, the present inventor, on Jan. 31, 1994; (2) U.S. Pat. No. 5,539,292, entitled "Capaciflector", filed in the name of Charles Campbell, Jr. on Feb. 15, 1995. The above are assigned to the assignee of the present invention. Moreover, the teachings of these related applications are herein meant to be incorporated by reference.

TECHNICAL FIELD

The present invention relates to capacitive proximity sensors and more particularly to a capacitive sensor conformally attached to a supporting three-dimensional structure.

BACKGROUND ART

Proximity sensors based on Capacitive-Controlled Oscillators (CCOs), in which two driven elements are configured as a "capaciflector," are available (see FIG. 1 and U.S. Pat. No. 5,166,679 ('679) for a discussion of the basic "capaciflector" technology) as are CCO-based sensor arrays. Capaciflectors employ a reflecting element located between the sensing element and the equipment on which the sensor is mounted. The reflecting element is driven at the same voltage and in phase with the sensing element. This configuration serves to control stray capacitance so that capaciflectors may be mounted in the close proximity of equipment and yet detect other objects at greater distances than other capacitive sensor technologies allow.

The capaciflector technology which has been taught in existing patents and in the related applications listed above is described in planar, or two-dimensional, terms. This is true both of single-sensor and sensor array configurations. In particular, the Specification of U.S. Pat. No. '679 referes to both the outer and intermediate electrical conductors as "thin sheet[s] of conductive material." The Capaciflector Camera, described in U.S. Pat. No. 5,373,245, is a planar extension of capaciflector technology to a plurality of capaciflectors arrayed substantially in a single plane.

The purpose of the driven shield is effectively to divert electric field lines from the sensing element away from ground (i.e., the equipment on which the sensor is mounted) so that the sensing element is relatively closer to the object to be sensed than it is to ground. Many sensor applications, however, are irregularly shaped so that the aforesaid purpose is not readily achieved by means of planar configurations. This invention, thus, relates to methods of achieving the advantages of capaciflector technology when the surface from which proximity is to be measured is of an arbitrary shape in three dimensions. Additionally, specialized applications can be achieved by means of three-dimensional capaciflector designs in order to achieve selective shadowing and detection of objects incident from selected directions. These designs, for example, provide for the accurate centering of pins in sockets.

STATEMENT OF THE INVENTION

Accordingly it is an object of this invention to provide an improvement in capaciflector sensors.

Another object of the present invention is to provide a capaciflector sensor readily applicable to surfaces of arbitrary shape in three dimensions.

It is still another object of the present invention is to provide a capaciflector sensor wherein the capaciflector components are conformally attached to three-dimensional structures of arbitrary shape.

A further object of the present invention is to provide a capaciflector sensor wherein the capaciflector components may be deformed from an original shape and then attached to three-dimensional structures of arbitrary shape.

A still further object of the present invention is to provide a capaciflector sensor allowing for enhanced sensitivity to an intruding object by virtue of geometrical masking of parasitic capacitances.

An additional object of the present invention is to provide a tube-type capacitive sensor with increased range and sensitivity.

Yet another object of the present invention is to provide a tube-type capacitive sensor with enhanced centering and edge detection of objects.

A further object of the present invention is to provide an array of capaciflector sensors readily applicable to surfaces of arbitrary shape in three dimensions.

The foregoing and other objects are achieved by providing one or more conducting films serving as capacitive sensing elements shaped to conform to the underlying surface of a machine, each backed by a reflector driven at the same voltage and in phase with the corresponding capacitive sensing element. Each reflector serves to reflect the electric field lines of the capacitive sensing element away from the surface of the machine on which the sensor is mounted so as to enhance the component constituted by the capacitance between the sensing element and an intruding object as a fraction of the total capacitance between the sensing element and ground. Each sensing element comprises a thin electrical conductor, while each reflecting element similarly comprises a thin electrical conductor geometrically shielding the corresponding sensing element from surfaces other than that of the object to be sensed. Each sensing element and corresponding reflecting element are electrically driven in phase, and the capacitance between the sensing element and the sensed object is determined using circuitry known to the art.

BRIEF DESCRIPTION OF THE DRAWINGS

FIG. 4A is a side view of an embodiment of the invention constituting a side-viewing sensor.

FIG. 4B is a sectional view of an alternative embodiment of the invention constituting a side-viewing sensor.

FIG. 4C is a side view of an embodiment permitting selective view of the object only from one side.

FIG. 4D is a sectional view of an embodiment of the invention constituting a centering sensor.

FIG. 4E is a sectional view of an embodiment of the invention constituting a docking sensor.

DETAILED DESCRIPTION OF THE INVENTION

Figure 1A:
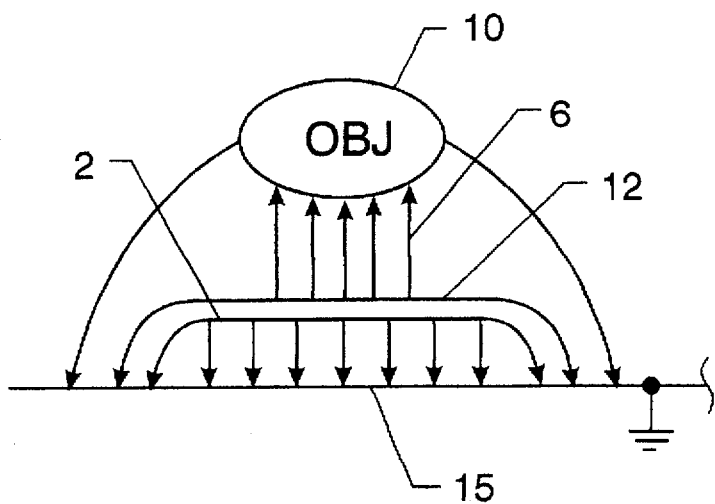
FIG. 1A shows the prior art "capaciflector" principle.
Figure 1B:
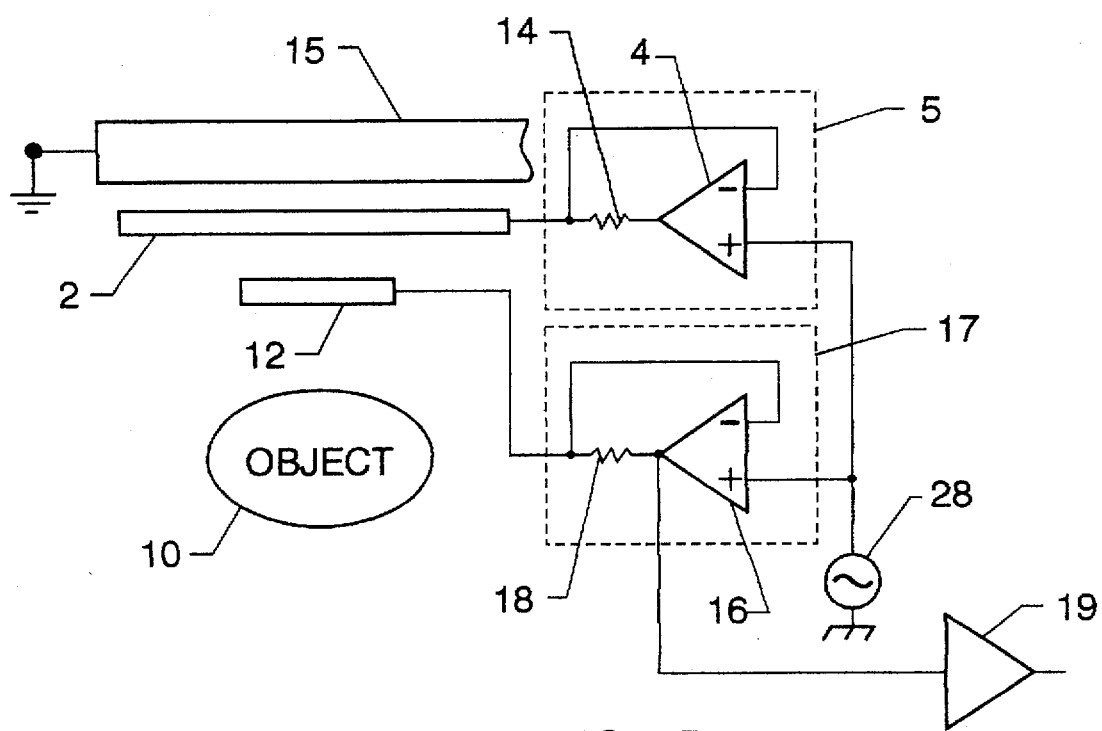
FIG. 1B is a circuit diagram illustrative of the prior art "capaciflector."

The fundamental advantages of capacitive-based sensors are retained in multiple new embodiments of the original "capaciflector" which is described in detail in U.S. Pat. No. '679. The principle of operation of the prior art capaciflector generally is illustrated in FIGS. 1A and 1B, where identical numerals represent identical elements. In FIG. 1A, a capacitive proximity sensing element 12 and a reflector shield 2 are mounted on a grounded surface 15 of a machine (not shown). Capacitive proximity sensing element 12 and reflector shield 2 are electrically insulated from each other and from grounded surface 15. Reflector shield 2 is driven electrically at the same voltage and in phase with sensor 12, and is used to reflect field lines 6 away from grounded surface 15 towards an intruding object 10. Grounded surface 15 is denoted alternatively as 'ground.'

The preferred method of locking sensor 12 and reflector shield 2 to the same driving voltage utilizes an electronic circuit architecture disclosed in the U.S. patent, "Current-Measuring Op-amp Devices," referenced above. The principle of operation of the attendant electrical circuit is shown schematically in FIG. 1B. Op-amp 16 and resistor 18 constitute a first current-measuring voltage follower circuit, denoted generally as numeral 17, the function of which is to couple voltage source 28 to sensor 12. Similarly, Op-amp 4 and resistor 14 constitute a second current-measuring voltage follower circuit, denoted generally as numeral 5, whose function is to couple voltage source 28 to reflector shield 2. Thus, both sensor 12 and reflector shield 2 are locked to source 28 voltage and thus also to each other.

In the presence of object 10, current through sensor 12 increases and this increased current is detected by a change in voltage across resistor 18 in sensor 12's first current-measuring voltage follower circuit 17. Due to shield 27 the presence of object 10 will also result in an increase of current flow through resistor 14. These increased currents through resistors 18 and 14 can be sensed and amplified using conventional amplification means 19, with the amplified signal then supplied to a suitable measurement/display device (not shown).

Figure 2A:
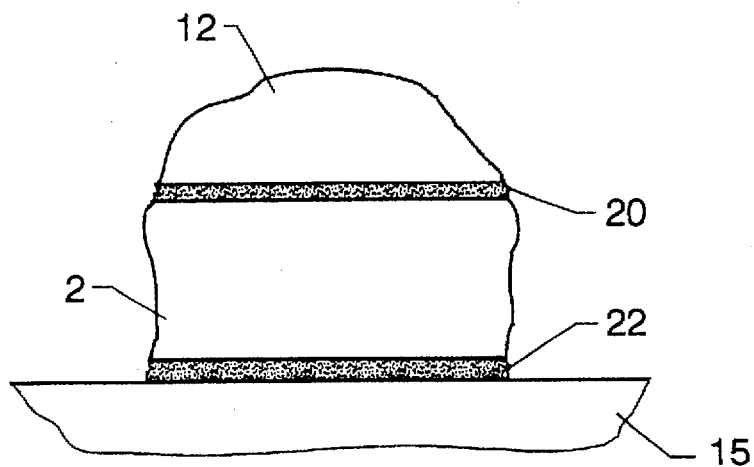
FIG. 2A is a side-section view of the invention illustrative of an arbitrary three-dimensional configuration of the capaciflector geometry.
Figure 2B:
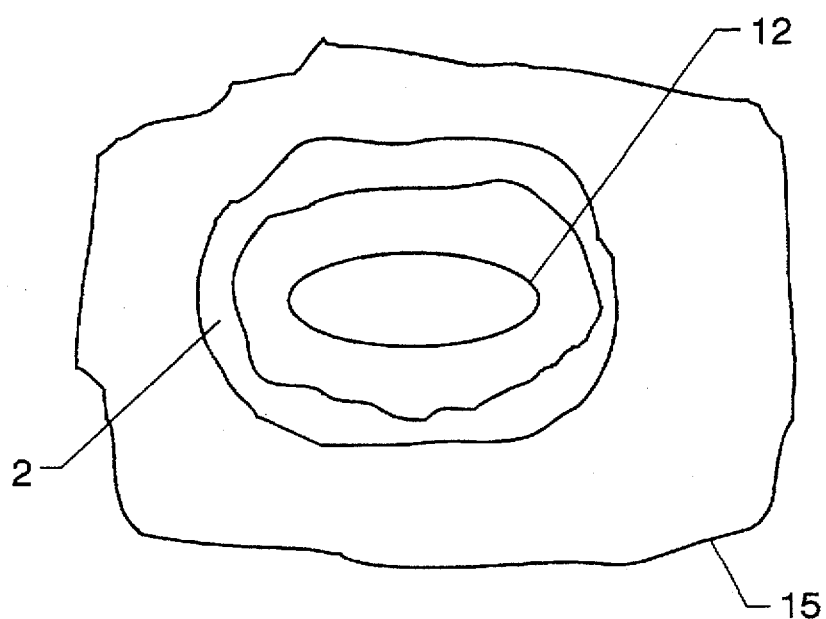
FIG. 2B is a top view of the invention illustrative of an arbitrary three-dimensional configuration of the capaciflector geometry.

While the prior art has suggested a planar configuration of sensor 12 and shield 2, many generalized three-dimensional configurations are possible. An arbitrary three-dimensional configuration is illustrated schematically in FIG. 2, specifically in FIG. 2A and FIG. 2B. In particular, sensor 12 and shield 2 or both may be split into various physical parts as long as parts of sensor 12 are electrically connected to each other and parts of shield 2 are connected to each other, and as long as sensor 12 and shield 2 are electrically insulated from each other. The fundamental requirement allowing the capaciflector to operate in a mode which optimizes the portion of the capacitance between sensor 12 and ground 15, is that driven shield 2 be interposed between sensor 12 and grounded surface 15, and that electrical insulation 20 be provided between sensor 12 and driven shield 2, and also that electrical insulation 22 be provided between sensor driven shield 2 and ground 15.

Figure 3:
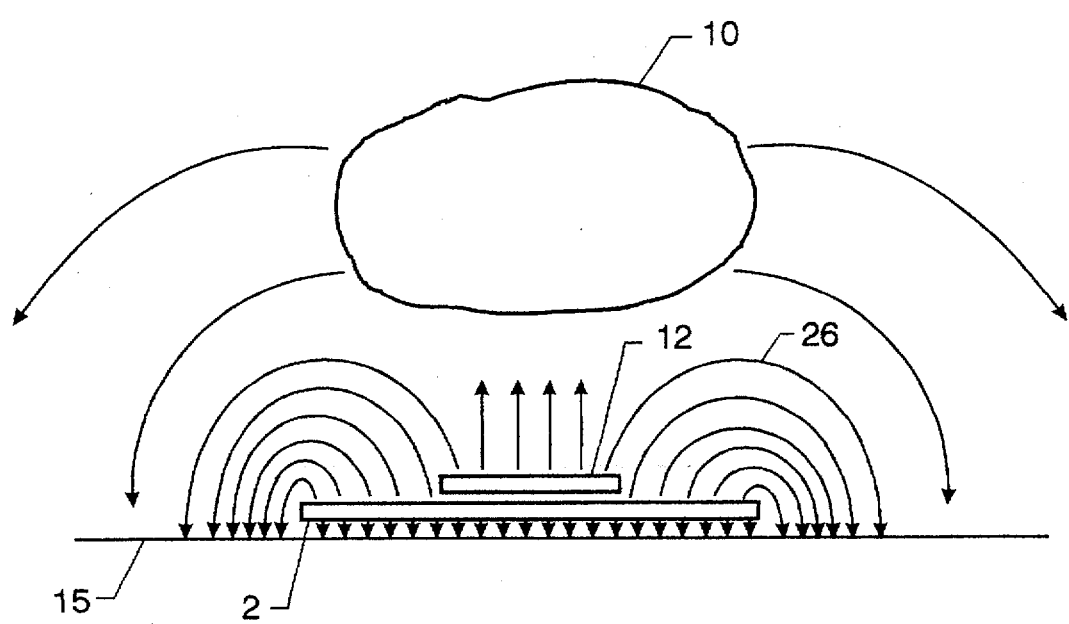
FIG. 3 is a diagram of the elements involved in the calculation of capacitance generally, for an arbitrary configuration of capaciflector sensor elements.

The circuit elements involved in the calculation of capacitance generally, for an arbitrary geometrical configuration of capaciflector sensors and shields are shown in FIG. 3. The relevant capacitances are denoted as follows:

$C_{seo}$ is the capacitance from sensor 12 to object 10.

$C_{og}$ is the capacitance from object 10 to ground 15.

$C_{seog}$ is the capacitance from sensor 12 to object 10 to ground 15.

$C_{seg}$ is the capacitance from sensor 12 directly to ground 15.

The objective in designing a capaciflector geometry for a particular application is to maximize the proportion of the capacitance measured between sensor 12 and ground 15 which is attributable to the presence of object 10. The total capacitance between sensor 12 and ground 15 is the parallel combination, or sum, of $C_{seog}$ and $C_{seg}$, where $C_{seg}$ includes all parasitic capacitances from sensor 12 to ground 15. The capacitance, $C_{og}$, between object 10 and ground 15, is typically much larger than the capacitance, $C_{seo}$, between sensor 12 and object 10. Therefore, $C_{seog}$, the series combination of $C_{og}$ and $C_{seo}$, can be approximated as $C_{seo}$. The proportion of the total capacitance between sensor 12 and ground 15 due to the presence of object 10 is thus: $C_{seo}/(C_{seg}+C_{seo})$ which is maximized by minimizing $C_{seg}$, the capacitance between sensor 12 and ground 15. This is accomplished by forcing electric field lines 26 to go around a wide driven shield 2, operating at the same electric potential as sensor 12, before reaching ground 15.

Several of the advantages of a three-dimensional capaciflector configuration are illustrated by reference to the exemplary embodiments shown in FIGS. 4, 5, 7, and 8. By tailoring the relative configuration of sensor 12 and driven shield 2, it is possible to shield sensor 12 both from ground 15 and from object 10 except for intended viewing angles. FIG. 4A shows a side view of one such embodiment: that of a side-viewing sensor denoted generally by numeral 30. In this embodiment, driven shield 2 is comprised of two sections: one driven shield section 32 situated between sensor 12 and grounded surface 15, and a second driven shield section 34 situated on the opposite side of sensor 12 from grounded surface 15. Sensor 12 is electrically insulated from driven shield sections 32 and 34 by means of an electrically insulating material 36. By virtue of driven shield sections 32 and 34, sensor 12 is shielded from objects lying outside a toroidal cone whose opening angle is determined by the relative dimensions of sensor 12 and driven shield sections 32 and 34.

All of the embodiments of the invention are capable of rugged construction. FIG. 4B shows a sectional view of a rugged embodiment of the side-viewing sensor described with reference to FIG. 4A. In this embodiment, driven shield section 34 is anchored rigidly by means of metal bolt 35 which is electrically insulated from sensor 12 and driven shield sections 32 by means of electrically insulating material 37.

In other applications, it may be desirable to provide for sensor 12 to be sensitive to object 10 only when object 10 is present in a particular orientation with respect to sensor 12. FIG. 4C shows a side view of an embodiment of the invention in which driven shield 2 is disposed surrounding sensor 12 in all but one azimuthal direction. In this case, sensor 12 is sensitive to the presence of object 10 only when it is present within a viewing cone 38 defined by surrounding driven shield 2.

FIG. 4D shows a sectional view of an embodiment of the invention in which sensor 12 is disposed as a ring 39 interior to and parallel to an inner surface 40 of socket 42. Driven shield 2 is disposed as a conducting layer 44 completely lining socket 42 and separated from inner surface 40 of a socket 42 by insulating layer 46. Sensor 12 is interior to driven shield 2 and separated therefrom by insulating layer 48. By virtue of this configuration, the distance between entering object 50 and side-wall 52 of socket 42 can be determined. This allows for an application such as centering object 50 as it is inserted into socket 42.

FIG. 4E shows a sectional view of an embodiment of the invention in which sensor 12 is disposed as a disk 52 interior to and parallel to bottom surface 54 of socket 42. Driven shield 2 is disposed as conducting layer 44 completely lining socket 42 and separated from inner surface 40 of socket 42 by insulating layer 46. Sensor 12 is interior to driven shield 2 and separated therefrom by insulating layer 48. By virtue of this configuration, the distance between entering object 50 and bottom surface 54 of socket 42 can be determined. This allows for an application such as docking object 50 as it is inserted into socket 42.

Figure 5:
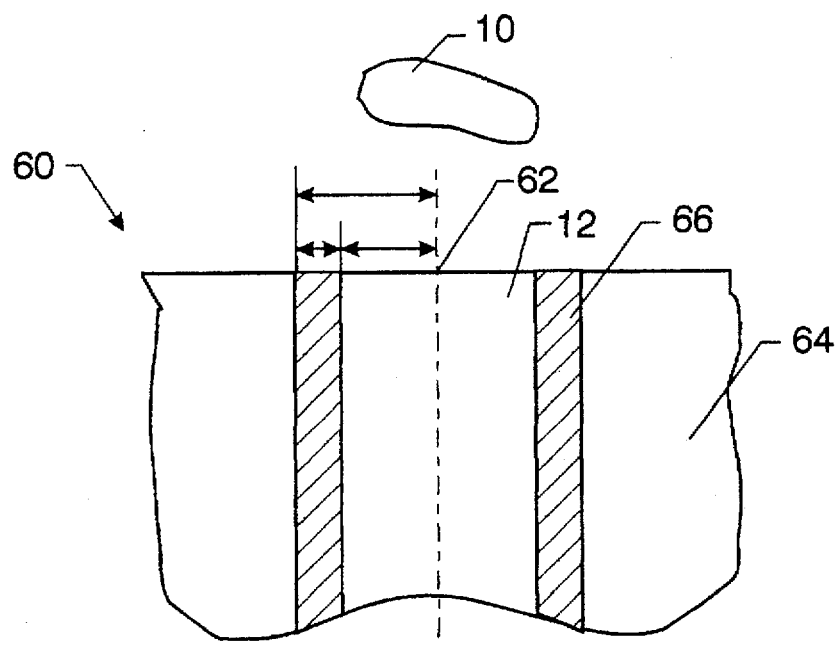
FIG. 5 is a sectional view of a prior art tube-type capacitive sensor.

FIG. 5 shows a cross-sectional view of a prior art tube-type capacitive sensor, denoted generally by numeral 60. Tube-type capacitive sensor 60 is intended to sense the presence of object 10 located along an axis 62. Sensor 12 is cylindrical and disposed within a grounded holder 64. Some prior art tube-type capacitive sensors 60 provide a driven sheath 66 which encases sensor 12 and which is electrically insulated both from sensor 12 and grounded holder 64.

Figure 6:
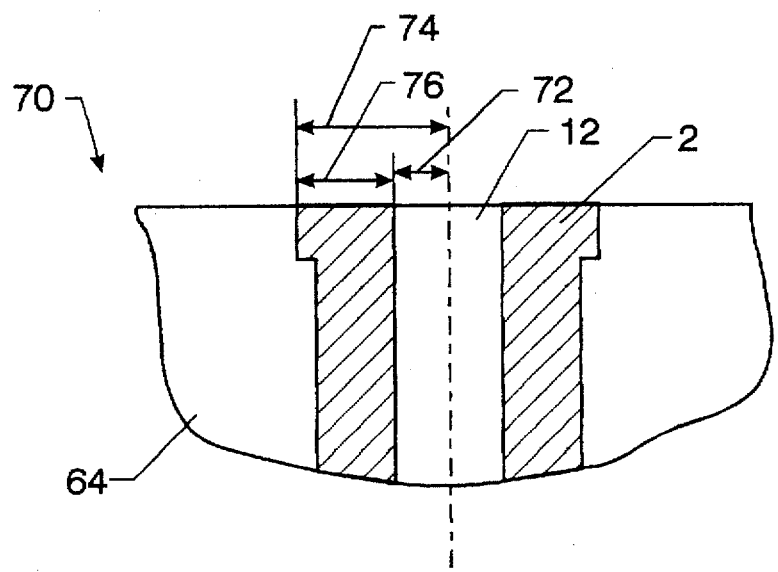
FIG. 6 is a sectional view of a capaciflector tube-type capacitive sensor.

FIG. 6 shows a cross-sectional view of an alternative embodiment of a three-dimensional capaciflector, denoted generally by numeral 70. Sensor 12 is cylindrical and disposed within grounded holder 64, as in the prior art. However, radius 72 of sensor 12 is small compared with radius 74 of grounded holder 64, with the intervening volume filled by driven shield 2, which is insulated electrically both from sensor 12 and grounded holder 64. By virtue of the large ratio of thickness 76 of shield 2 to radius 72 of sensor 12, the signal-to-noise ratio of a three-dimensional capaciflector, denoted generally as numeral 70, exceeds that of conventional tube-type capacitive sensor 60 (shown in FIG. 5), and range and sensitivity for a given size sensor 12 are improved.

Figure 7:
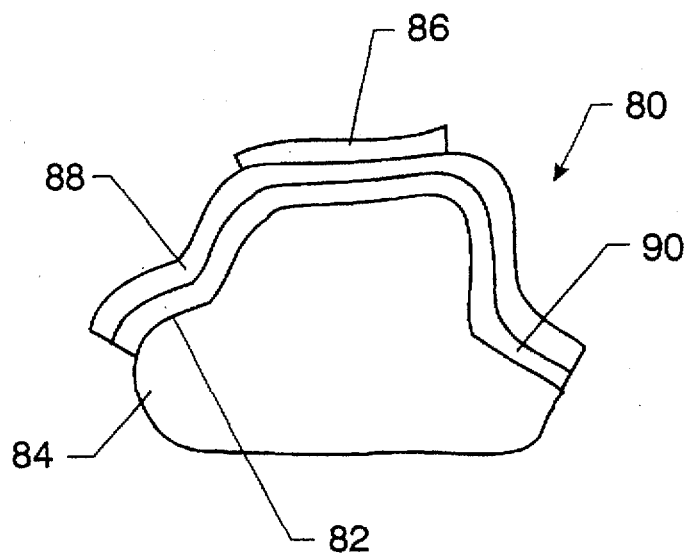
FIG. 7 is a sectional view of an embodiment of the invention fabricated by means of conformal films.

Referring now to FIG. 7, a three-dimensional capaciflector, denoted generally by numeral 80, may be fabricated to conform to the arbitrary shape of surface 82 of a three-dimensional object 84. In this embodiment, three-dimensional capaciflector 80 is comprised of a conducting layer 86 fashioned from any electrically conducting deformable material such as copper film. Conducting layer 86 serves the function of capaciflector sensor 12, and is separated by an electrically insulating deformable layer 88 from a conducting layer 90 which is also fashioned from any electrically conducting deformable material. Additionally, the various layers 86, 88, and 90, need not be deformable and may be formed by many conventional fabricating techniques including, by way of example, vapor deposition, sputtering, painting, or plating.

Figure 8:
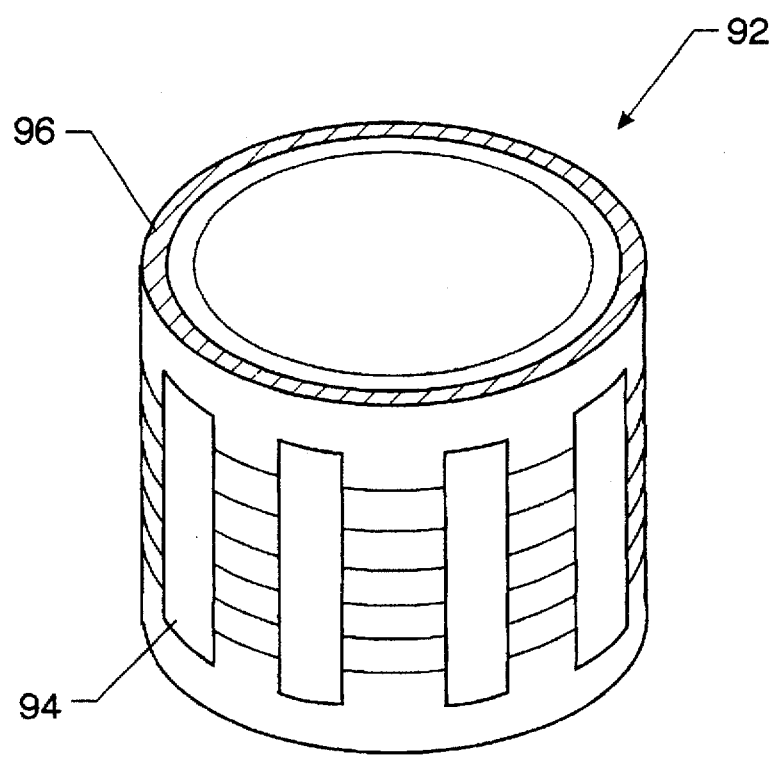
FIG. 8 is a perspective view of a cylindrical capaciflector camera.

FIG. 8 shows a capaciflector camera denoted generally by numeral 92. A planar capaciflector camera has been taught in U.S. Pat. No. 5,373,245 of Vranish, entitled "Capaciflector Camera." Capaciflector camera 92 is distinguished from the prior art in that it is of arbitrary three-dimensional shape, illustrated specifically as a cylindrical array in FIG. 8. One method of fabricating capaciflector camera 92 in the cylindrical shape shown is to form sensors 94 and driven shield 96 out of a laminant of thin flexible sheets and to bend sensors 94 and a driven shield 96 around a cylinder (not shown) to form the shape which is depicted. Clearly, this is a single example. Capaciflector camera 92 may consist of rows, columns, or any other arbitrary grouping of geometrical shapes, and may be made to conform to an overall three-dimensional shape, using conventional fabricating techniques including, by way of example, vapor deposition, sputtering, painting or plating. The overall three-dimensional shape is tailored to a particular application and is a matter of design choice.

The multiple embodiments which have been taught as examples of three dimensional capaciflector configurations all accomplish the objects of providing a capaciflector sensor readily applicable to surfaces of arbitrary shape in three dimensions. To those skilled in the art, many modifications and variations of the present invention are possible in light of the above teachings. It is therefore to be understood that within the scope of the appended claims the invention may be practiced otherwise than as specifically described.

I claim:

1. An improved capacitive type proximity sensor capable of sensing in three dimensions comprising:

at least one outer electrical conductor spaced from an arbitrary, non-planar surface of a machine forming one electrode of a sensor capacitor, the other electrode comprising an object spaced from said machine, said outer electrical conductor including a first conducting layer which is shaped to conform to the arbitrary, non-planar surface of said machine;

at least one intermediate electrical conductor corresponding to each of said outer electrical conductors located between said outer electrical conductor and said machine being of a size substantially larger than said outer electrical conductor to act as a shield for reducing the parasitic capacitance between said outer electrical conductor and said machine, said intermediate electrical conductor including a layer of conductive material of the same arbitrary, non-planar shape as said surface of said machine and geometrically shielding said first conducting layer from said machine;

means for electrically insulating each of said outer electrical conductors from each of said intermediate electrical conductors;

means for electrically insulating each of said intermediate electrical conductors from said surface of said machine;

first circuit means for coupling in phase the instantaneous voltage at each of said outer electrical conductors to its corresponding said intermediate electrical conductor; and second circuit means coupled to each of said outer electrical conductors and being responsive to the capacitance of each said sensor capacitor for generating a control signal to said machine.

2. The capacitive type proximity sensor of claim 1 wherein said surface of said machine is irregularly shaped in at least one of three dimensions.

3. The capacitive type proximity sensor of claim 1 wherein said intermediate electrical conductor envelops said outer electrical conductor in all directions but those specifically chosen to provide directional sensitivity of said capacitive type proximity sensor.

4. The capacitive type proximity sensor of claim 1 wherein said intermediate electrical conductor lines a recess in said surface of said machine and wherein said outer electrical conductor lies along an interior wall of said recess.

5. The capacitive type proximity sensor of claim 4 wherein said outer electrical conductor is is disposed parallel to a bottom surface of said recess.

6. The capacitive type proximity sensor of claim 1 wherein said intermediate electrical conductor and said outer electrical conductor are thin layers of a film shaped to conform to an arbitrary shape of said surface of said machine.

7. The capacitive type proximity sensor of claim 6 wherein said thin layers of film are flexible.

* * * * *